(12) United States Patent
Xiang (10) Patent No.: US 9,385,554 B2
(45) Date of Patent: Jul. 5, 2016

(54) CHARGER AND CHARGER CONTROLLING METHOD FOR A BATTERY ROD HAVING A SMALL BATTERY CAPACITY

(71) Applicant: Zhiyong Xiang, Guangdong (CN)

(72) Inventor: Zhiyong Xiang, Guangdong (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 293 days.

(21) Appl. No.: 14/068,191

(22) Filed: Oct. 31, 2013

(65) Prior Publication Data

US 2015/0069952 A1    Mar. 12, 2015

(30) Foreign Application Priority Data

Sep. 9, 2013   (CN) .......................... 2013 1 0407084

(51) Int. Cl.
*H02J 7/00* (2006.01)
*A24F 47/00* (2006.01)

(52) U.S. Cl.
CPC .............. *H02J 7/007* (2013.01); *H02J 7/0047* (2013.01); *H02J 7/0052* (2013.01); *A24F 47/008* (2013.01)

(58) Field of Classification Search
CPC .. H02J 7/0027; H02J 2007/0037; H02J 7/007
USPC ......................................................... 320/107
See application file for complete search history.

(56) References Cited

U.S. PATENT DOCUMENTS

| | | | | |
|---|---|---|---|---|
| 6,037,751 A * | 3/2000 | Klang | ........................... | 320/160 |
| 2009/0160407 A1* | 6/2009 | Hwang | ........................ | 320/157 |
| 2014/0354231 A1* | 12/2014 | Xiang | .......................... | 320/114 |
| 2014/0360512 A1* | 12/2014 | Xiang | .......................... | 131/328 |
| 2014/0375249 A1* | 12/2014 | Xiang | .......................... | 320/107 |
| 2015/0015186 A1* | 1/2015 | Xiang | .......................... | 320/107 |
| 2015/0027472 A1* | 1/2015 | Amir | ............................. | 131/329 |
| 2015/0035540 A1* | 2/2015 | Xiang | .......................... | 324/426 |
| 2015/0036250 A1* | 2/2015 | Xiang | ............................. | 361/78 |
| 2015/0181942 A1* | 7/2015 | Holzherr et al. | .............. | 320/114 |

* cited by examiner

*Primary Examiner* — Suchin Parihar
(74) *Attorney, Agent, or Firm* — Tim Tingkang Xia, Esq.; Locke Lord LLP (57) ABSTRACT

A charger and a charger controlling method for a battery rod having a small battery capacity are provided, which are used to charge a battery rod comprising a charging management circuit, and the battery capacity C of the battery rod is less than 100 mAh. The method comprises: defining a preset constant charging current I based on the battery capacity C of the battery rod in order to charge the battery rod with a current of KC, wherein, the value of K is less than 1, and the value of I and the value of C conform to the following relationship: I=K*C; detecting a real-time charging current $I_{temp}$ of the battery rod in real time; comparing $I_{temp}$ with I, and adjusting the output charging voltage according to the comparison result to charge the battery rod with a current of KC.

16 Claims, 9 Drawing Sheets

CHARGER AND CHARGER CONTROLLING METHOD FOR A BATTERY ROD HAVING A SMALL BATTERY CAPACITY

CROSS-REFERENCE TO RELATED APPLICATIONS

This non-provisional application claims priority under 35 U.S.C. §119(a) on Patent Application No. 201310407084.6, filed in P.R. China on Sep. 9, 2013, the entire contents of which are hereby incorporated by reference.

FIELD OF THE INVENTION

The present application relates to the field of electronic cigarettes, and more particularly relates to a charger and a charger controlling method for a battery rod having a small battery capacity.

BACKGROUND OF THE INVENTION

At present, most electronic cigarettes on the market use reusable integrated assemblies with constant-charging ability. A charging current defined in the hardware of the electronic cigarette falls into a standard range from 90 mA to 120 mA or a standard range from 200 mA to 330 mA. The battery rod in this kind of electronic cigarette is regarded as a battery rod with a charging management circuit. The charging management circuit in the battery rod can control the battery to be constantly charged with a default constant charging current, and the above two standard ranges constitute a value range of the default constant charging current.

Besides, at present, in conventional electronic cigarette chargers for most integrated microphone assemblies on the market, a power source of 5V is connected to a charging interface of the electronic cigarette, and a battery in the electronic cigarette is managed by a charging management circuit in the electronic cigarette to be charged constantly. The charging current with a constant value is suitable for part of chargeable batteries with a large battery capacity. However, battery capacities of many small-sized electronic cigarettes (for example the battery capacity is only 50 mAh) are less than the capacity of the value of the charging current. In this case, if the battery having a small battery capacity is charged with a large current, the service life of the battery will be shortened and the operation performance of the battery will be degraded. For example, a charging current for a common lithium battery is less than or equal to 0.5 C, and the performance and the life of the battery will be reduced if the battery is charged with a current larger than or equal to 1 C. It should be understood that if a battery with a capacity of 50 mAh is charged with a current of 100 mA, the charging current is regarded to be 2 C. A preferred charging current is 0.5 C, namely the charging current for a chargeable battery with a capacity of 100 mAh is preferably defined as 50 mA.

In a word, the charging method with a charging current larger than or equal to 1 C is prejudicial to common electronic cigarettes.

SUMMARY OF THE INVENTION

The object of the present application is to provide a charger and a charger controlling method for a battery rod having a small battery capacity, aiming at the drawbacks in the prior art that the service life and the operation performance of a battery are reversely affected when a battery rod having a charging management circuit is charged with a current larger than or equal to 1 C.

The technical schemes to solve the above technical problems are as follows.

In one aspect, a charger controlling method for a battery rod having a small battery capacity is provided, which is used to charge a battery rod comprising a charging management circuit, and the battery capacity C of the battery rod is less than 100 mAh.

The Method Comprises:

S1: defining a preset constant charging current I based on the battery capacity C of the battery rod in order to charge the battery rod with a current of KC, and the preset constant charging current I is less than a default constant charging current of the charging management circuit; wherein, the value of K is less than 1, and when the unit of the battery capacity C is mAh and the unit of the preset constant charging current I is mA, the value of the preset constant charging current I and the value of the battery capacity C conform to the following relationship: I=K*C;

S2: detecting a real-time charging current $I_{temp}$ of the battery rod in real time;

S3: comparing the real-time charging current $I_{temp}$ with the preset constant charging current I, and adjusting the output charging voltage according to the comparison result so as to charge the battery rod with a current of KC.

In one embodiment, the preset constant charging current I in step S1 is defined unchangeably according to a battery rod having a specific battery capacity, and the preset constant charging current is defined by defining an unchangeable reference voltage $U_{ref}$.

In another embodiment, the preset constant charging current I in step S1 is defined changeably according to battery rods with different small battery capacities, and the method for defining the preset constant charging current I comprises:

S11: calculating the value of the preset constant charging current I when the battery rod is charged with a current of KC based on the battery capacity C of the battery rod;

S12: adjusting a reference voltage $U_{ref}$, and displaying a value of the preset constant charging current I corresponding to the adjusted reference voltage $U_{ref}$;

S13: determining whether the value of the preset constant charging current I in step S12 is equal to the value of the preset constant charging current I in step S11, if not, turning to step S12 to adjust the reference voltage $U_{ref}$ continuously.

In this embodiment, in step S12, the reference voltage $U_{ref}$ is adjusted by changing the resistance value of a voltage-dividing resistor, and the value of the preset constant charging current I corresponding to the adjusted reference voltage $U_{ref}$ is displayed by an LCD display.

In this embodiment, the relationship between the reference voltage $U_{ref}$ and the preset constant charging current I is as follows:

$$U_{ref}=I*R_c$$

wherein, Rc represents the resistance of a sampling resistor defined to detect the real-time charging current $I_{temp}$ of the battery rod in step S2.

In this embodiment, in step S3, the real-time charging current $I_{temp}$ and the preset constant charging current I are compared by comparing a voltage signal $U_{temp}$ corresponding to the real-time charging current $I_{temp}$ with a reference voltage $U_{ref}$ corresponding to the preset constant charging current I.

In this embodiment, in step S3, the method for controlling to output the adjusted charging voltage based on the comparison result comprises:

controlling to output an increased charging voltage if $U_{temp}$ is less than $U_{ref}$;

controlling to output a decreased charging voltage if $U_{temp}$ is larger than $U_{ref}$;

controlling to output an unchangeable charging voltage if $U_{temp}$ is equal to $U_{ref}$.

In another aspect, a charger for a battery rod having a small battery capacity is also provided, which is used to charge a battery rod including a charging management circuit, and the battery capacity C of the battery rod is less than 100 mAh. The charger comprises a charging input interface defined to connect to an external power source and a charging output interface defined to connect to the battery rod. The charger further comprises a control unit, a constant current output unit and a current sampling unit. The control unit is connected to the charging input interface, the constant current output unit and the current sampling unit respectively; the constant current output unit is further connected to the charging input interface and the charging output interface respectively; the current sampling unit is further connected to the charging output interface. The current sampling unit is used to detect a real-time charging current of the battery rod in real time. The control unit is used to define a preset constant charging current based on the battery capacity of the battery rod, wherein the preset constant charging current is less than a default constant charging current of the charging management circuit, and the value of the preset constant charging current is less than the value of the battery capacity; the control unit is also used to compare the real-time charging current with the preset constant charging current, and output a control signal to the constant current output unit according to the comparison result. The constant current output unit is used to adjust the output charging voltage to the charging output interface based on the control signal so as to charge the battery rod.

In one embodiment, the control unit includes a microprocessor.

In this embodiment, the control unit further includes a reference voltage defining circuit defined to unchangeably define a reference voltage corresponding to the preset constant charging current, and the reference voltage defining circuit is connected to the microprocessor. The microprocessor is used to control the constant current output unit to charge a battery rod having a specific battery capacity based on the comparison result between the reference voltage and a voltage signal corresponding to the real-time charging current.

In this embodiment, the model of the microprocessor is SN8P2711, and the reference voltage defining circuit includes a first voltage-dividing resistor and a second voltage-dividing resistor. One end of the first voltage-dividing resistor is connected to a first pin of the microprocessor, and the other end of the first voltage-dividing resistor is respectively connected to one end of the second voltage-dividing resistor and a sixth pin of the microprocessor; and the other end of the second voltage-dividing resistor is connected to the ground.

In another embodiment, the control unit further includes a reference voltage defining circuit and a feedback display circuit. The reference voltage defining circuit and the feedback display circuit are respectively connected to the microprocessor. The feedback display circuit is used to display the preset constant charging current corresponding to the reference voltage that the reference voltage defining circuit provides to the microprocessor in real time. The reference voltage defining circuit is used to adjust the reference voltage according to the battery capacity of the battery rod and the preset constant charging current displayed in real time by the feedback display circuit when the battery rod is changed. The microprocessor is used to control the constant current output unit to use the preset constant charging current corresponding to the adjusted reference voltage to charge the corresponding battery rod having a small battery capacity based on the comparison result between the adjusted reference voltage and a voltage signal corresponding to the real-time charging current.

In this embodiment, the model of the microprocessor is SN8P2711.

In this embodiment, the reference voltage defining circuit includes an adjustment potentiometer. A first end of adjustment potentiometer is connected to a first pin of the microprocessor, a second end of the adjustment potentiometer is connected to the ground, and a third end of the adjustment potentiometer is connected to a sixth pin of the microprocessor. The sixth pin of the microprocessor is used to receive the reference voltage from the third end of the adjustment potentiometer.

In this embodiment, the feedback display circuit includes an LCD display defined to display the preset constant charging current.

In another embodiment, the charger further includes a voltage regulating unit. The voltage regulating unit is respectively connected to the charging input interface and the control unit. The voltage regulating unit is used to receive an input voltage from the external power source and supply a constant operating voltage to the control unit.

In this embodiment, the voltage regulating unit includes a first resistor, a first triode, a first filter capacitor and a zener diode. The collector of the first triode is connected to a voltage output port of the charging input interface; the base of the first triode is connected to a cathode of the zener diode, and an anode of the zener diode is connected to the ground; the emitter of the first triode is connected to the microprocessor. One end of the first filter capacitor is connected to the emitter of the first triode, and the other end of the first filter capacitor is connected to the ground. One end of the first resistor is connected to the base of the first triode, and the other end of the first resistor is connected to the collector of the first triode.

In another embodiment, the constant current output unit includes a second triode, a third triode, a second resistor, a third resistor, and a forth resistor. The emitter of the second triode is connected to a voltage output port of the charging input interface; the collector of the second triode is connected to a positive output port of the charging output interface; the base of the second triode is connected to the collector of the third triode via the forth resistor; the base of the third triode is connected to the microprocessor via the third resistor; the emitter of the third triode is connected to the ground; one end of the second resistor is connected to the base of the second triode, and the other end of the second resistor is connected to the emitter of the second triode.

In the aspect, the current sampling unit includes a current sampling resistor, a current limiting resistor, and a second filter capacitor. One end of the current sampling resistor is respectively connected to a negative output port of the charging output interface and one end of the current limiting resistor, and the other end of the current sampling resistor is connected to the ground; the other end of the current limiting resistor is connected to the microprocessor; and the second filter capacitor is connected in parallel with two series resistors comprising the current sampling resistor and the current limiting resistor.

In a further embodiment, the control unit includes a voltage comparator and a reference voltage defining circuit. A first voltage input port of the voltage comparator is connected to the current sampling unit, and a second voltage input port of the voltage comparator is connected to the reference voltage defining circuit, and an output port of the voltage comparator is connected to the constant current output unit. The reference voltage defining circuit is used to unchangeably define a reference voltage corresponding to the preset constant charging current and provide the reference voltage to the second voltage input port; the voltage comparator is used to control the constant current output unit to output the preset constant charging current corresponding to the reference voltage based on the comparison result between a voltage signal corresponding to the real-time charging current received at the first voltage input port and the reference voltage received at the second voltage input port, so as to charge a battery rod having a designated battery capacity.

The following beneficial effects can be achieved when implementing the charger and the charger controlling method for a battery rod having a small battery capacity of the present application. A preset constant charging current I is defined based on the battery capacity C of a battery rod, and the preset constant charging current I is used to charge the battery rod with a current of KC (K is less than 1). Wherein, the preset constant charging current I is less than a default constant charging current of the charging management circuit. In this way, although the default constant charging current is large, the charging current for the battery rod is determined by the preset constant charging current I since the preset constant charging current I is small. In order to overcome the above drawbacks due to the charging current that is larger than or equal to 1 C, the value of K is less than 1. And then the battery rod is charged with a current of KC according to the determined preset constant charging current I. Above all, in order to improve the widely using ability of the charger, for battery rods having different battery capacities, the preset constant charging current I of the charger can be adjusted manually by a user based on a battery capacity or a reference charging current labeled on the battery rod. Therefore, a battery rod having any small battery capacity can be charged with a current of KC.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENTS

To make the objects, technical schemes and advantages more clearly, the present application may be further described in detail with reference to the accompanying drawings and embodiments.

To overcome the defects that the service life of a battery may be shortened and the operation performance of the battery may be degraded if the battery rod with a built-in charging management circuit is charged with a current larger than or equal to 1 C in the prior art, a charger and a charger controlling method for a battery rod having a small battery capacity is provided in the present application.

In the present application, a preset constant charging current I is defined based on the battery capacity C of a battery rod to charge the battery rod with a current of KC (K is less than 1), and the preset constant charging current I is less than a default constant charging current of the charging management circuit. In this way, although the default constant charging current is large, the charging current for the battery rod is determined by the preset constant charging current I since the preset constant charging current I is small. In order to overcome the above drawbacks due to the charging current that is larger than or equal to 1 C, the value of K is less than 1. And then the battery rod is charged with a current of KC according to the determined preset constant charging current I.

Figure 1:
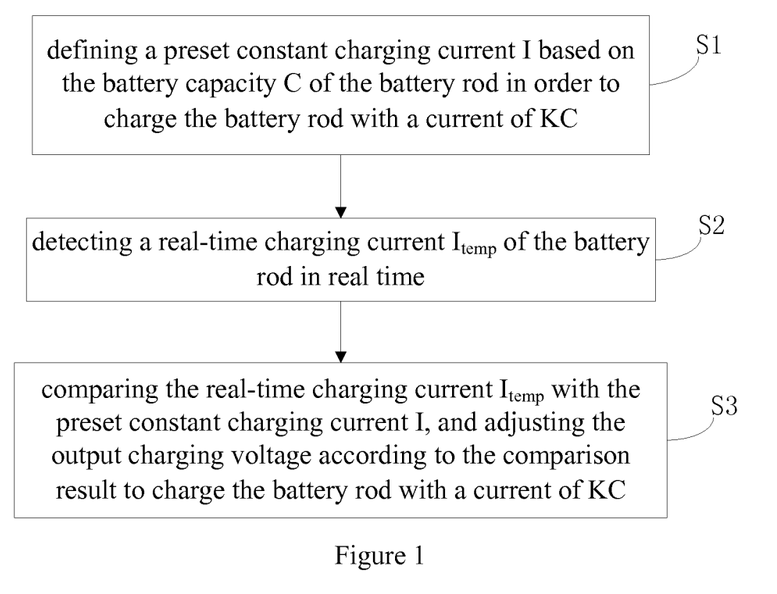
FIG. 1 is a flowchart of a charger controlling method for a battery rod having a small battery capacity of the present application.

Referring to FIG. 1, a flowchart of a charger controlling method for a battery rod having a small battery capacity of the present application is shown.

The charger controlling method in the present application is used to charge a battery rod that comprises a charging management circuit and the battery capacity C of the battery rod is less than 100 mAh. The method comprises following steps.

S1: defining a preset constant charging current I based on the battery capacity C of the battery rod in order to charge the battery rod with a current of KC, and the preset constant charging current I is less than a default constant charging current of the charging management circuit; wherein, the value of K is less than 1, and when the unit of the battery capacity C is mAh and the unit of the preset constant charging current I is mA, the value of the preset constant charging current I and the value of the battery capacity C conform to the following relationship: I=K*C.

In step S1, there are two cases when defining the preset constant charging current I.

In one case, the preset constant charging current I is defined unchangeably according to a battery rod having a specific battery capacity. Advantageously, in this case, the value of K is defined as 0.5. Many methods can be adopted in this case, for example, one method is to define the preset constant charging current directly through a software, another method is to define the preset constant charging current through a reference voltage defining circuit.

In another case, the preset constant charging current I is defined changeably according to battery rods with different small battery capacities. In this case, referring to FIG. 2, a flowchart of a charger controlling method for a battery rod having a small battery capacity of a preferred embodiment of the present application is shown.

Figure 2:
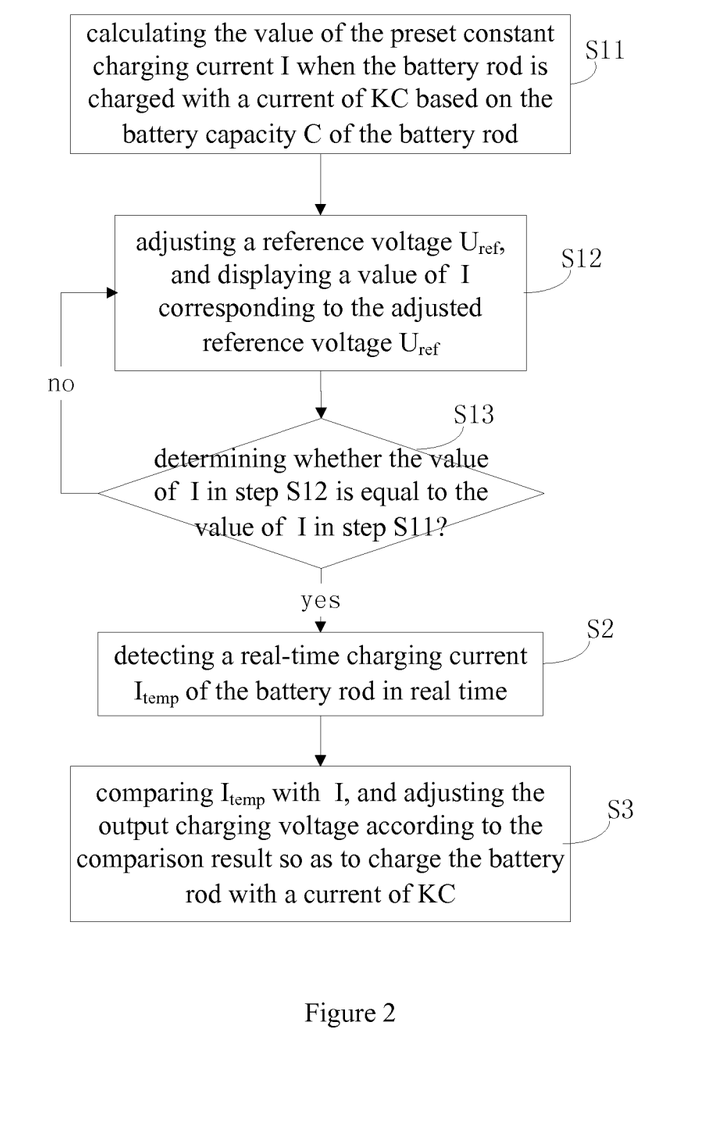
FIG. 2 is a flowchart of a charger controlling method for a battery rod having a small battery capacity of a preferred embodiment of the present application.

No matter whether a software or a reference voltage defining circuit is used, a reference voltage $U_{ref}$ is provided. Namely, the preset constant charging current I is defined by defining an unchangeable reference voltage $U_{ref}$. The reference voltage $U_{ref}$ is a voltage drop when the preset constant charging current flows through a current sampling resistor, namely the relationship between the reference voltage $U_{ref}$ and the preset constant charging current I is as follows:

$$U_{ref} = I * R_c$$

wherein, Rc represents a resistance value of the current sampling resistor.

Therefore, in a most preferred embodiment, the preset constant charging current I is adjusted through adjusting the reference voltage $U_{ref}$, and the method is described in detail in the following.

S11: calculating the value of the preset constant charging current I when the battery rod is charged with a current of KC based on the battery capacity C of the battery rod.

The battery capacity and reference charging current of a battery rod is labeled on the battery rod, so a user can be aware of the value of the preset constant charging current I that is needed to be adjusted.

S12: adjusting a reference voltage $U_{ref}$, and displaying a value of the preset constant charging current I corresponding to the adjusted reference voltage $U_{ref}$.

No matter the preset constant charging current I is defined before the charger leaves the factory or is defined by a user before operation, the reference voltage $U_{ref}$ can be adjusted through changing the resistance value of a voltage-dividing resistor. In order to facilitate a user to acquire the value of the preset constant charging current I corresponding to each adjusting operation in the adjusting process, the preset constant charging current I can be displayed by an LCD display.

S13: determining whether the value of the preset constant charging current I in step S12 is equal to the value of the preset constant charging current I in step S11, if not, turning to step S12 to adjust the reference voltage $U_{ref}$ continuously.

After the preset constant charging current I is defined, sequential steps in the method for controlling to charge constantly are as follows.

S2: detecting a real-time charging current $I_{temp}$ of the battery rod in real time. The current is detected through detecting a voltage drop $U_{temp}$ on a current sampling resistor, wherein, $U_{temp} = I_{temp} * R_c$.

S3: comparing the real-time charging current $I_{temp}$ with the preset constant charging current I, and adjusting the output charging voltage according to the comparison result so as to charge the battery rod with a current of KC.

The real-time charging current $I_{temp}$ and the preset constant charging current I are compared through comparing a voltage signal $U_{temp}$ corresponding to the real-time charging current $I_{temp}$ with a reference voltage $U_{ref}$ corresponding to the preset constant charging current I. Specifically, the method for controlling to output the adjusted charging voltage based on the comparison result includes: controlling to output an increased charging voltage if $U_{temp}$ is less than $U_{ref}$; controlling to output a decreased charging voltage if $U_{temp}$ is larger than $U_{ref}$; controlling to output an unchangeable charging voltage if $U_{temp}$ is equal to $U_{ref}$.

Figure 3:
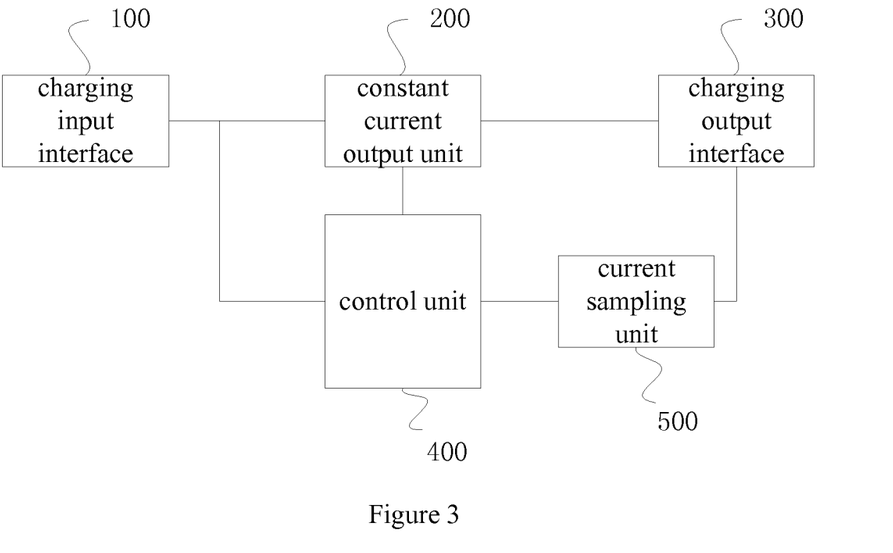
FIG. 3 is an block diagram of a charger for a battery rod having a small battery capacity of the present application.

The present application also provides a charger for a battery rod having a small battery capacity. Referring to FIG. 3, an block diagram of a charger for a battery rod having a small battery capacity of the present application is shown.

The charger for a battery rod having a small battery capacity is used to charge a battery rod including a charging management circuit, and the battery capacity C of the battery rod is less than 100 mAh. The charger comprises a charging input interface 100 defined to connect to an external power source and a charging output interface 300 defined to connect to the battery rod. The charger further comprises a control unit 400, a constant current output unit 200 and a current sampling unit 500.

The control unit 400 is connected to the charging input interface 100, the constant current output unit 200 and the current sampling unit 500 respectively. The constant current output unit 200 is further connected to the charging input interface 100 and the charging output interface 300 respectively. The current sampling unit 500 is further connected to the charging output interface 300.

The current sampling unit 500 is used to detect a real-time charging current of the battery rod in real time.

The control unit 400 is used to define a preset constant charging current based on the battery capacity of the battery rod, wherein the preset constant charging current is less than a default constant charging current of the charging management circuit, and the value of the preset constant charging current is less than the value of the battery capacity. The control unit 400 is also used to compare the real-time charging current with the preset constant charging current, and output a control signal to the constant current output unit 200 according to the comparison result.

The constant current output unit 200 is used to adjust the output charging voltage to the charging output interface 300 based on the control signal so as to charge the battery rod.

Figure 4:
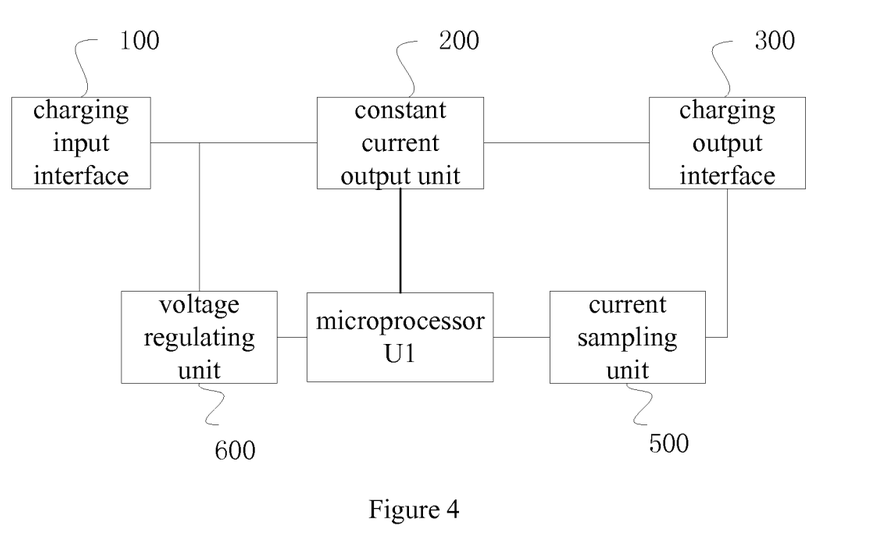
FIG. 4 is a block diagram of a charger for a battery rod having a small battery capacity of a first preferred embodiment of the present application.
Figure 5:
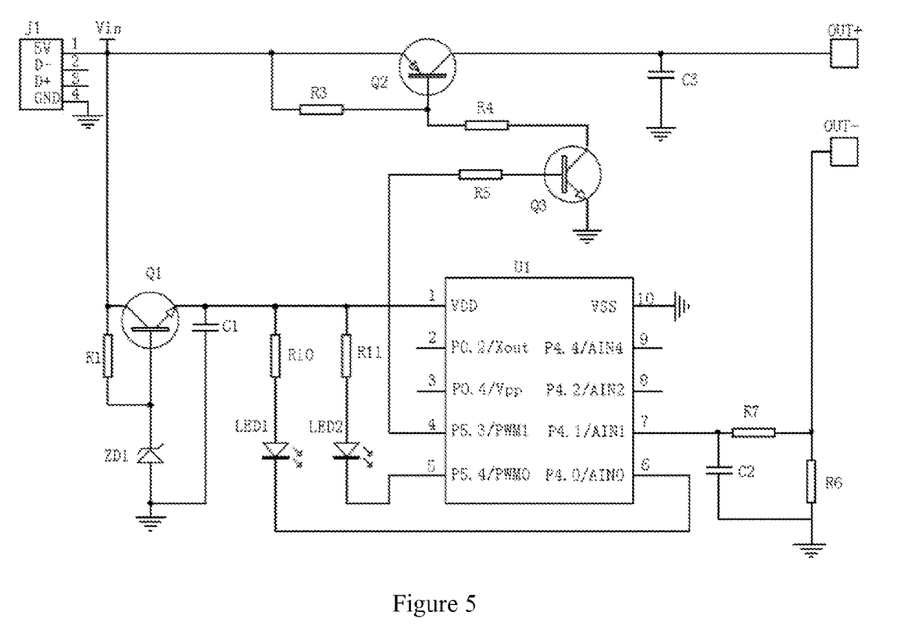
FIG. 5 is a circuit layout of the charger for a battery rod having a small battery capacity of the first preferred embodiment of the present application.

FIG. 4 is a block diagram of a charger for a battery rod having a small battery capacity of a first preferred embodiment of the present application, and FIG. 5 is a circuit layout of the charger for a battery rod having a small battery capacity of the first preferred embodiment of the present application.

In the first preferred embodiment, the charger further comprises a voltage regulating unit 600. The voltage regulating unit 600 is respectively connected to the charging input interface 100 and the control unit 400. The voltage regulating unit 600 is used to receive an input voltage from the external power source and supply a constant operating voltage to the control unit 400.

Combining FIG. 3, FIG. 4 and FIG. 5, in the first preferred embodiment, the control unit 400 includes a microprocessor U1, and the reference voltage is directly defined through the software program installed inside the microprocessor U1. The model of the microprocessor U1 is SN8P2711, and the charging input interface 100 includes a USB interface J1.

Wherein, the constant current output unit 200 includes a second triode Q2, a third triode Q3, a second resistor R3, a third resistor R5, and a forth resistor R4. The emitter of the second triode Q2 is connected to a voltage output port of the charging input interface 100; the collector of the second triode Q2 is connected to a positive output port OUT+ of the charging output interface 300; the base of the second triode Q2 is connected to the collector of the third triode Q3 via the forth resistor R4. The base of the third triode Q3 is connected to the forth pin of the microprocessor U1 via the third resistor R5; and the emitter of the third triode Q3 is connected to the ground. One end of the second resistor R3 is connected to the base of the second triode Q2, and the other end of the second resistor R3 is connected to the emitter of the second triode Q2.

Wherein, the current sampling unit 500 includes a current sampling resistor R6, a current limiting resistor R7, and a second filter capacitor C2. One end of the current sampling resistor R6 is respectively connected to a negative output port OUT- of the charging output interface 300 and one end of the current limiting resistor R7, and the other end of the current sampling resistor R6 is connected to the ground. The other end of the current limiting resistor R7 is connected to a seventh pin of the microprocessor U1. The second filter capacitor C2 is connected in parallel with two series resistors comprising the current sampling resistor R6 and the current limiting resistor R7.

Wherein, the voltage regulating unit 600 includes a first resistor R1, a first triode Q1, a first filter capacitor C1 and a zener diode ZD1. The collector of the first triode Q1 is connected to a voltage output port of the charging input interface 100; the base of the first triode Q1 is connected to a cathode of the zener diode ZD1, and an anode of the zener diode ZD1 is connected to the ground; the emitter of the first triode Q1 is connected to a first pin of the microprocessor U1. One end of the first filter capacitor C1 is connected to the emitter of the first triode Q1, and the other end of the first filter capacitor C1 is connected to the ground. One end of the first resistor R1 is connected to the base of the first triode Q1, and the other end of the first resistor R1 is connected to the collector of the first triode Q1.

The forth pin of the microprocessor U1 is defined to control the on-and-off of the third triode Q3, and the seventh pin of the microprocessor U1 is defined to detect a voltage drop on the current sampling resistor R6. In case that the reference voltage is defined, the microprocessor U1 can control the charger to use a preset constant charging current corresponding to the reference voltage to constantly charge the battery rod. The process is described in detail as follows.

The current sampling resistor R6 samples a voltage drop generated when the real-time charging current flows through the current sampling resistor R6, and then the current sampling resistor R6 provides a voltage signal to the seventh pin of the microprocessor U1. The microprocessor U1 compares the voltage drop corresponding to the voltage signal with the reference voltage. If the voltage drop is less than the reference voltage, the forth pin of the microprocessor U1 outputs a PWM signal having a increased duty ratio to the base of the third triode Q3, so that the on-period of the third triode Q3 is increased, and the on-period of the second triode Q2 is increased correspondingly. Therefore, the charging voltage to be finally output and the real-time charging current are both increased. Through the above adjustment and feedback, in the end, the real-time charging current can be equal to the preset constant charging current. In like manner, if the voltage drop is higher than the reference voltage, the forth pin of the microprocessor U1 outputs a PWM signal having a decreased duty ratio to the base of the third triode Q3.

Figure 6:
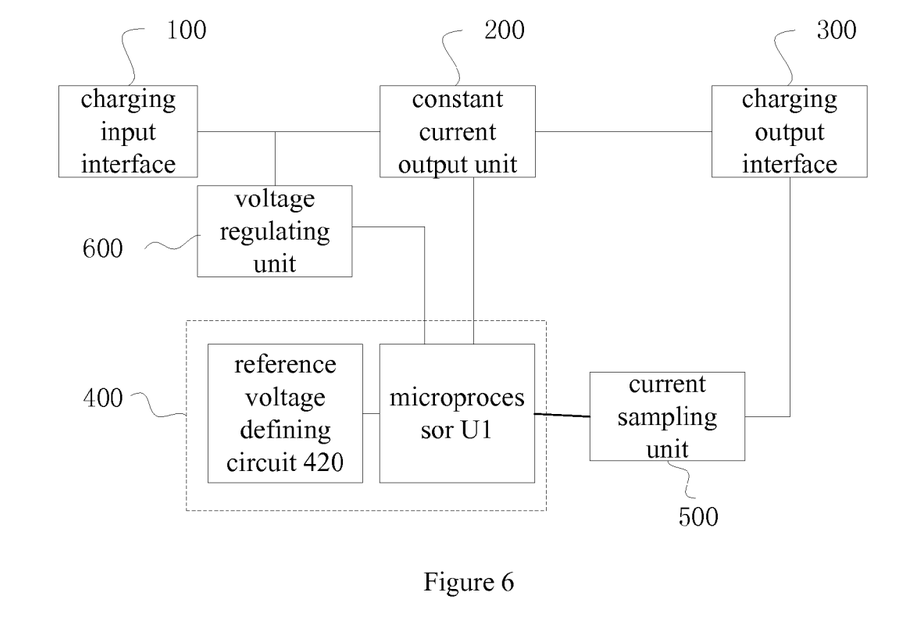
FIG. 6 is a block diagram of a charger for a battery rod having a small battery capacity of a second preferred embodiment of the present application.
Figure 7:
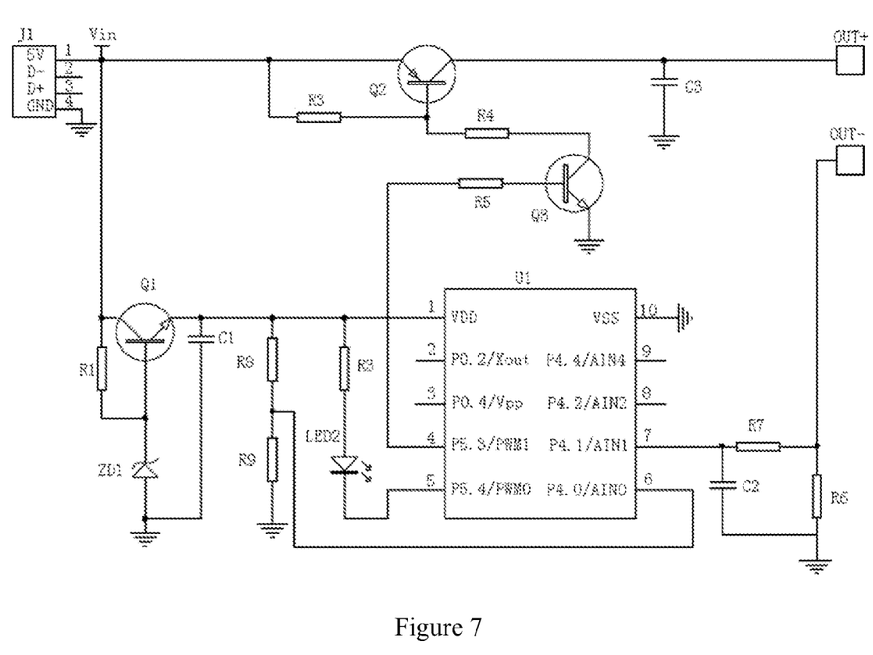
FIG. 7 is a circuit layout of the charger for a battery rod having a small battery capacity of the second preferred embodiment of the present application.

FIG. 6 is a block diagram of a charger for a battery rod having a small battery capacity of a second preferred embodiment of the present application, and FIG. 7 is a circuit layout of the charger for a battery rod having a small battery capacity of the second preferred embodiment of the present application.

Compared to the first preferred embodiment, the control unit 400 in the second preferred embodiment further includes a reference voltage defining circuit 420 defined to unchangeably define a reference voltage corresponding to the preset constant charging current. The microprocessor U1 is used to control the constant current output unit 200 to charge a battery rod having a specific battery capacity based on the comparison result between the reference voltage and a voltage signal corresponding to the real-time charging current.

In a word, different from the first preferred embodiment, in the second preferred embodiment, the reference voltage is defined not directly through the software program installed inside the microprocessor U1, but through a voltage-dividing resistor in the reference voltage defining circuit 420.

The reference voltage defining circuit 420 includes a first voltage-dividing resistor R8 and a second voltage-dividing resistor R9. One end of the first voltage-dividing resistor R8 is connected to a first pin of the microprocessor U1, and the other end of the first voltage-dividing resistor R8 is respectively connected to one end of the second voltage-dividing resistor R9 and a sixth pin of the microprocessor U1. The other end of the second voltage-dividing resistor R9 is connected to the ground. The voltage drop on the resistor R9 is the reference voltage.

Compared to the first preferred embodiment, in the second preferred embodiment, the reference voltage can be reset through changing the resistance value of the first voltage-dividing resistor R8 or the second voltage dividing resistor R9.

Figure 8:
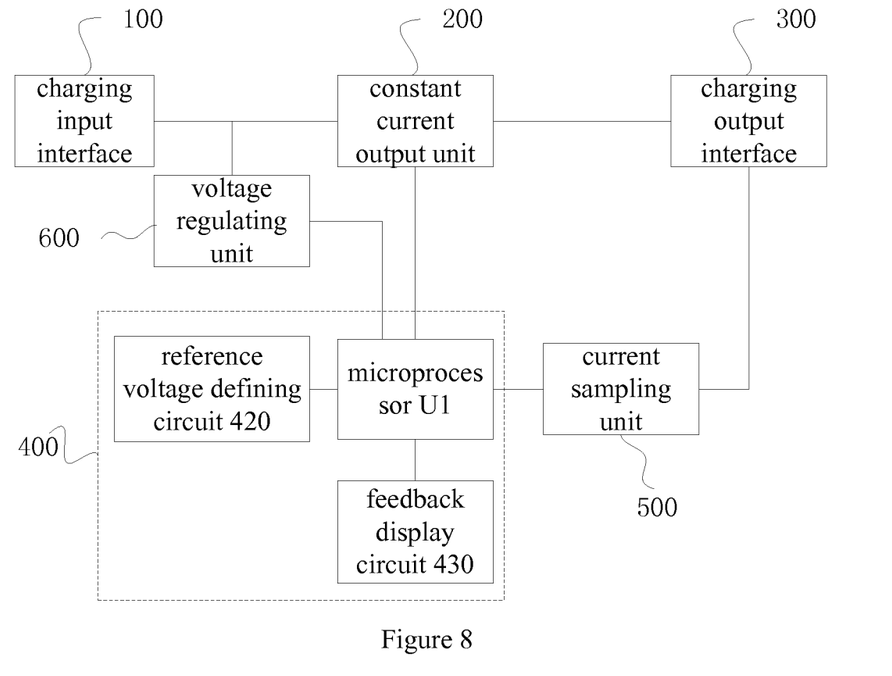
FIG. 8 is a block diagram of a charger for a battery rod having a small battery capacity of a third preferred embodiment of the present application.
Figure 9:
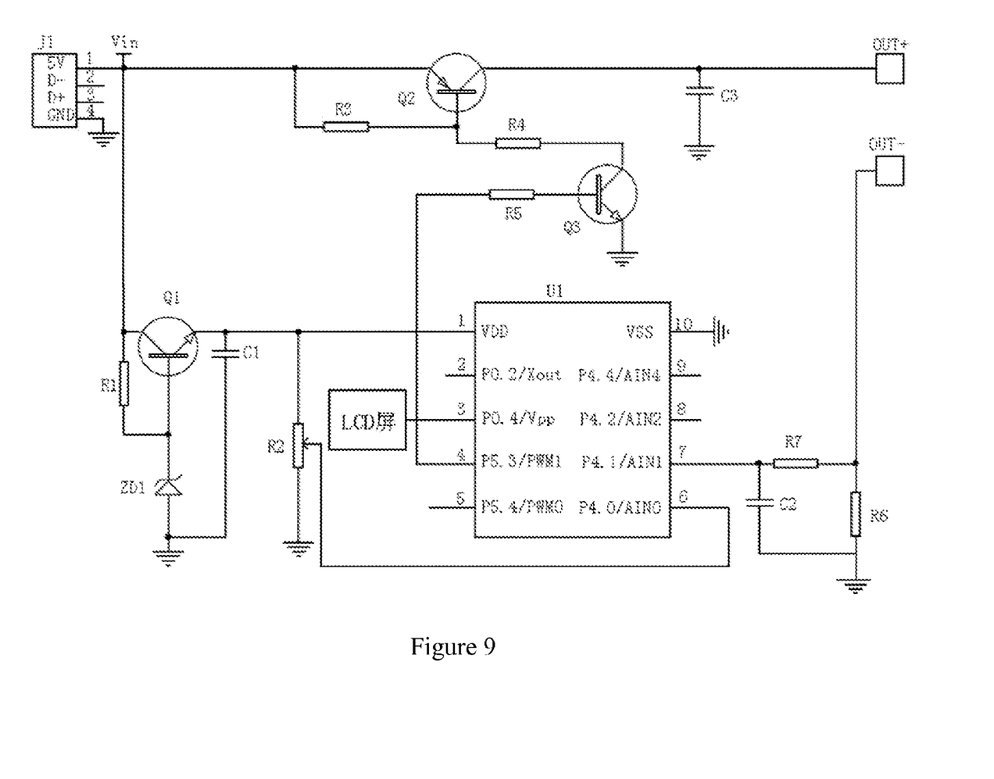
FIG. 9 is a circuit layout of the charger for a battery rod having a small battery capacity of the third preferred embodiment of the present application.

FIG. 8 is a block diagram of a charger for a battery rod having a small battery capacity of a third preferred embodiment of the present application, and FIG. 9 is a circuit layout of the charger for a battery rod having a small battery capacity of the third preferred embodiment of the present application.

In the third preferred embodiment, the control unit 400 includes a microprocessor U1, a reference voltage defining circuit 420 and a feedback display circuit 430. The reference voltage defining circuit 420 and the feedback display circuit 430 are respectively connected to the microprocessor 410. The model of the microprocessor is SN8P2711.

The feedback display circuit 430 is used to display the preset constant charging current corresponding to the reference voltage that the reference voltage defining circuit 420 provides to the microprocessor U1 in real time. The reference voltage defining circuit 420 is used to adjust the reference voltage according to the battery capacity of the battery rod and the preset constant charging current displayed in real time by the feedback display circuit 430 when the battery rod is changed. The microprocessor U1 is used to control the constant current output unit 200 to use the preset constant charging current corresponding to the adjusted reference voltage to charge the corresponding battery rod having a small battery capacity based on the comparison result between the adjusted reference voltage and a voltage signal corresponding to the real-time charging current.

Different from two aforementioned embodiments, in the third preferred embodiment, the reference voltage can be re-adjusted according to battery rods having different small battery capacities, namely the preset constant charging current can be re-adjusted. In two aforementioned embodiments, the reference voltage can't be changed once the reference voltage is defined when the charger leaves the factory. However, in the third preferred embodiment, when the charger leaves the factory and when the charger is in use after having left the factory, the reference voltage can be adjusted at any time on demand, so the charger has a good transplanting ability.

The reference voltage defining circuit 420 includes an adjustment potentiometer R2. A first end of the adjustment potentiometer R2 is connected to a first pin of the microprocessor U1, a second end of the adjustment potentiometer R2 is connected to the ground, and a third end of the adjustment potentiometer R2 is connected to a sixth pin of the microprocessor U1. Wherein, the sixth pin of the microprocessor U1 is defined to receive the reference voltage from the third end of the adjustment potentiometer R2.

The feedback display circuit 430 includes an LCD display defined to display the preset constant charging current.

When the charger leaves the factory, a reference voltage corresponding to a preset constant charging current when a battery rod having a common small battery capacity (such as 100 mAh) is charged with a current of 0.5 C can be defined. In the present embodiment, the preset constant charging current can be defined to 0.5*100, namely 50 mA.

When in use, if a user need to use the charger to charge a battery rod having a battery capacity of 50 mAh, the user can adjust the preset constant charging current (such as adjust the preset constant charging current to 25 mA) according to the value of a battery capacity or a reference charging current labeled on the battery rod, and then the battery rod can be charged.

Figure 10:
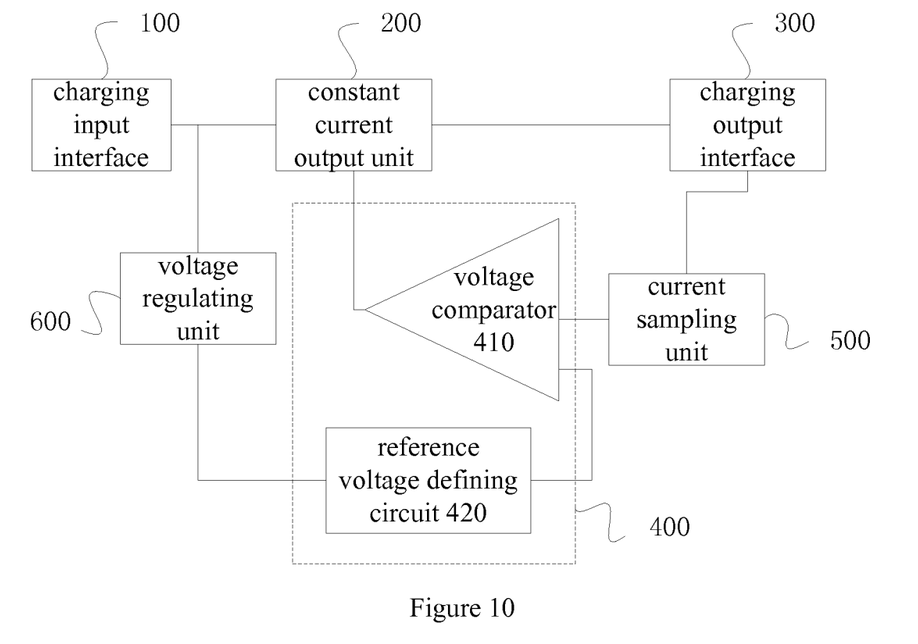
FIG. 10 is a block diagram of a charger for a battery rod having a small battery capacity of a forth preferred embodiment of the present application.

FIG. 10 is a block diagram of a charger for a battery rod having a small battery capacity of a forth preferred embodiment of the present application.

The control unit 400 includes a voltage comparator 410 and a reference voltage defining circuit 420.

In three aforementioned embodiments, the voltage comparison and the control of the third triode Q3 are both carried out by the microprocessor, but in the forth preferred embodiment, the above functions are realized by the voltage comparator 410.

A first voltage input port of the voltage comparator 410 is connected to the current sampling unit 500, and a second voltage input port of the voltage comparator 410 is connected to the reference voltage defining circuit 420, and an output port of the voltage comparator 410 is connected to the constant current output unit 200.

The reference voltage defining circuit 420 is used to unchangeably define a reference voltage corresponding to the preset constant charging current and provide the reference voltage to the second voltage input port. The voltage comparator 410 is used to control the constant current output unit 200 to output the preset constant charging current corresponding to the reference voltage based on the comparison result between a voltage signal corresponding to the real-time charging current received at the first voltage input port and the reference voltage received at the second voltage input port, so as to charge a battery rod having a designated battery capacity. The detailed structure of the reference voltage defining circuit 420 is the same as the structure of the reference voltage defining circuit 420 in the second preferred embodiment, and need not to be described here.

In a word, in the present application, a preset constant charging current I is defined based on the battery capacity C of a battery rod, and the preset constant charging current I is used to charge the battery rod with a current of KC (K is less than 1). Wherein, the preset constant charging current I is less than a default constant charging current of the charging management circuit. In this way, although the default constant charging current is large, the charging current for the battery rod is determined by the preset constant charging current I since the preset constant charging current I is small. In order to overcome the above drawbacks due to the charging current that is larger than or equal to 1 C, the value of K is less than 1. And then the battery rod is charged with a current of KC according to the determined preset constant charging current I. Above all, in order to improve the widely using ability of the charger, for battery rods having different battery capacities, the preset constant charging current I of the charger can be adjusted manually by a user based on a battery capacity or a reference charging current labeled on the battery rod. Therefore, a battery rod having any small battery capacity can be charged with a current of KC.

While the embodiments of the present application have been described with reference to the drawings, the present application will not be limited to above embodiments that are illustrative but not limitative. It will be understood by those skilled in the art that various changes and equivalents may be substituted in the light of the present application without departing from the scope of the present application, and those various changes and equivalents shall fall into the protection of the application.

What is claimed is:

1. A charger controlling method for a battery rod having a small battery capacity, which is used to charge a battery rod comprising a charging management circuit, and the battery capacity C of the battery rod less than 100 mAh, wherein the method comprises:

S1: defining a preset constant charging current I based on the battery capacity C of the battery rod in order to charge the battery rod with a current of KC, and the preset constant charging current I is less than a default constant charging current of the charging management circuit; wherein, the value of K is less than I, and when the unit of the battery capacity C is mAh and the unit of the preset constant charging current I is mA, the value of the preset constant charging current I and the value of the battery capacity C conform to the following relationship: I=K*C;

S2: detecting a real-time charging current $I_{temp}$ of the battery rod in real time;

S3: comparing the real-time charging current $I_{temp}$ with the preset constant charging current I, and adjusting the output charging voltage according to the comparison result so as to charge the battery rod with a current of KC;

wherein the preset constant charging current I in step S1 is defined changeably according to battery rods with different small battery capacities, and the method for defining the preset constant charging current I comprises:

S11: calculating the value of the preset constant charging current I when the battery rod is charged with a current of KC based on the battery capacity C of the battery rod;

S12: adjusting a reference voltage $U_{ref}$, and displaying a value of the preset constant charging current I corresponding to the adjusted reference voltage $U_{ref}$;

S13: determining whether the value of the preset constant charging current I in step S12 is equal to the value of the preset constant charging current I in step S11, if not, turning to step S12 to adjust the reference voltage $U_{ref}$ continuously.

2. The charger controlling method for a battery rod having a small battery capacity according to claim 1, wherein in step S12, the reference voltage $U_{ref}$ is adjusted by changing the resistance value of a voltage-dividing resistor, and the value of the preset constant charging current I corresponding to the adjusted reference voltage $U_{ref}$ is displayed by an LCD display.

3. The charger controlling method for a battery rod having a small battery capacity according to claim 1, wherein the relationship between the reference voltage $U_{ref}$ and the preset constant charging current I is as follows:

$$U_{ref}=I*R_c$$

wherein, $R_c$ represents the resistance of a current sampling resistor defined to detect the real-time charging current $I_{temp}$ of battery rod in step S2.

4. The charger controlling method for a battery rod having a small battery capacity according to claim 1, wherein in step S3, the real-time charging current $I_{temp}$ and the preset constant charging current I are compared by comparing a voltage signal $U_{temp}$ corresponding to the real-time charging current $I_{temp}$ with a reference voltage $U_{ref}$ corresponding to the preset constant charging current I.

5. The charger controlling method for a battery rod having a small battery capacity according to claim 4, wherein in step S3, the method for controlling to output the adjusted charging voltage based on the comparison result comprises:
  controlling to output an increased charging voltage if $U_{temp}$, is less than $U_{ref}$;
  controlling to output a decreased charging voltage if $U_{temp}$, is larger than $U_{ref}$;
  controlling to output an unchangeable charging voltage if $U_{temp}$ is equal to $U_{ref}$.

6. A charger for a battery rod having a small battery capacity, which is used to charge a battery rod including a charging management circuit, and the battery capacity C of the battery rod less than 100 mAh; the charger comprising a charging input interface defined to connect to an external power source and a charging output interface defined to connect to the battery rod, wherein the charger further comprising a control unit, a constant current output unit, a current sampling unit and a voltage regulating unit;
  the control unit is connected to the charging input interface, the constant current output unit and the current sampling unit respectively; the constant current output unit is further connected to the charging input interface and the charging output interface respectively; the current sampling unit is further connected to the charging output interface;
  the current sampling unit is used to detect a real-time charging current of the battery rod in real time;
  the control unit is used to define a preset constant charging current based on the battery capacity of the battery rod, wherein the preset constant charging current is less than a default constant charging current of the charging management circuit, and the value of the preset constant charging current is less than the value of the battery capacity; the control unit is also used to compare the real-time charging current with the preset constant charging current, and output a control signal to the constant current output unit according to the comparison result;
  the constant current output unit is used to adjust the output charging voltage to the charging output interface based on the control signal so as to charge the battery rod;
  the voltage regulating unit is respectively connected to the charging input interface and the control unit the voltage regulating unit is used to receive an input voltage from the external power source and supply a constant operating voltage to the control unit;
  wherein the control unit includes a microprocessor.

7. The charger for a battery rod having a small battery capacity according to claim 6, wherein the control unit further includes a reference voltage defining circuit defined to unchangeably define a reference voltage corresponding to the preset constant charging current, and the reference voltage defining circuit is connected to the microprocessor;
  the microprocessor is used to control the constant current output unit to charge a battery rod having a specific battery capacity based on the comparison result between the reference voltage and a voltage signal corresponding to the real-time charging current.

8. The charger for a battery rod having a small battery capacity according to claim 7, wherein the model of the microprocessor is SN8P2711, and the reference voltage defining circuit includes a first voltage-dividing resistor and a second voltage-dividing resistor;
  one end of the first voltage-dividing resistor is connected to a first pin of the microprocessor, and the other end of the first voltage-dividing resistor is respectively connected to one end of the second voltage-dividing resistor and a sixth pin of the microprocessor; and the other end of the second voltage-dividing resistor is connected to the ground.

9. The charger for a battery rod having a small battery capacity according to claim 6, wherein the control unit further includes a reference voltage defining circuit and a feedback display circuit;
  the reference voltage defining circuit and the feedback display circuit are respectively connected to the microprocessor;
  the feedback display circuit is used to display the preset constant charging current corresponding to the reference voltage that the reference voltage defining circuit provides to the microprocessor in real time;
  the reference voltage defining circuit is used to adjust the reference voltage according to the battery capacity of the battery rod and the preset constant charging current displayed in real time by the feedback display circuit when the battery rod is changed;
  the microprocessor is used to control the constant current output unit to use the preset constant charging current corresponding to the adjusted reference voltage to charge the corresponding battery rod having a small battery capacity based on the comparison result between the adjusted reference voltage and a voltage signal corresponding to the real-time charging current.

10. The charger for a battery rod having a small battery capacity according to claim 9, wherein the model of the microprocessor is SN8P2711.

11. The charger for a battery rod having a small battery capacity according to claim 10, wherein the reference voltage defining circuit includes an adjustment potentiometer;
  a first end of the adjustment potentiometer is connected to a first pin of the microprocessor, a second end of the adjustment potentiometer is connected to the ground, and a third end of the adjustment potentiometer is connected to a sixth pin of the microprocessor;
  the sixth pin of the microprocessor is used to receive the reference voltage from the third end of the adjustment potentiometer.

12. The charger for a battery rod having a small battery capacity according to claim 10, wherein the feedback display circuit includes an LCD display defined to display the preset constant charging current.

13. The charger for a battery rod having a small battery capacity according to claim 6, wherein the voltage regulating unit includes a first resistor, a first triode, a first filter capacitor and a zener diode;
  the collector of the first triode is connected to a voltage output port of the charging input interface; the base of the first triode is connected to a cathode of the zener diode, and an anode of the zener diode is connected to the ground; the emitter of the first triode is connected to the microprocessor;
  one end of the first filter capacitor is connected to the emitter of the first triode, and the other end of the first filter capacitor is connected to the ground;
  one end of the first resistor is connected to the base of the first triode, and the other end of the first resistor is connected to the collector of the first triode.

14. The charger for a battery rod having a small battery capacity according to claim 6, wherein the constant current output unit includes a second triode, a third triode, a second resistor, a third resistor, and a forth resistor;

the emitter of the second triode is connected to a voltage output port of the charging input interface; the collector of the second triode is connected to a positive output port of the charging output interface; the base of the second triode is connected to the collector of the third triode via the forth resistor; the base of the third triode is connected to the microprocessor via the third resistor; the emitter of the third triode is connected to the ground; one end of the second resistor is connected to the base of the second triode, and the other end of the second resistor is connected to the emitter of the second triode.

15. The charger for a battery rod having a small battery capacity according to claim 6, wherein the current sampling unit includes a current sampling resistor, a current limiting resistor, and a second filter capacitor;

one end of the current sampling resistor is respectively connected to a negative output port of the charging output interface and one end of the current limiting resistor, and the other end of the current sampling resistor is connected to the ground; the other end of the current limiting resistor is connected to the microprocessor; and the second filter capacitor is connected in parallel with two series resistors comprising the current sampling resistor and the current limiting resistor.

16. A charger for a battery rod having a small battery capacity, which is used to charge a battery rod including a charging management circuit, and the battery capacity C of the battery rod less than 100 mAh; the charger comprising a charging input interface defined to connect to an external power source and a charging output interface defined to connect to the battery rod, wherein the charger further comprising a control unit, a constant current output unit and a current sampling unit;

the control unit is connected to the charging input interface, the constant current output unit and the current sampling unit respectively; the constant current output unit is further connected to the charging input interface and the charging output interface respectively; the current sampling unit is further connected to the charging output interface;

the current sampling unit is used to detect a real-time charging current of the battery rod in real time;

the control unit is used to define a preset constant charging current based on the battery capacity of the battery rod, wherein the preset constant charging current is less than a default constant charging current of the charging management circuit, and the value of the preset constant charging current is less than the value of the battery capacity; the control unit is also used to compare the real-time charging current with the preset constant charging current, and output a control signal to the constant current output unit according to the comparison result the constant current output unit is used to adjust the output charging voltage to the charging output interface based on the control signal so as to charge the battery rod;

wherein the control unit includes a voltage comparator and a reference voltage defining circuit;

a first voltage input port of the voltage comparator is connected to the current sampling unit, and a second voltage input port of the voltage comparator is connected to the reference voltage defining circuit, and an output port of the voltage comparator is connected to the constant current output unit;

the reference voltage defining circuit is used to unchangeably define a reference voltage corresponding to the preset constant charging current and provide the reference voltage to the second voltage input port; the voltage comparator is used to control the constant current output unit to output the preset constant charging current corresponding to the reference voltage based on the comparison result between a voltage signal corresponding to the real-time charging current received at the first voltage input port and the reference voltage received at the second voltage input port, so as to charge a battery rod having a designated battery capacity.

* * * * *